(12) United States Patent
Halliday et al.

(10) Patent No.: US 11,840,964 B2
(45) Date of Patent: Dec. 12, 2023

(54) SHAFT COMPONENT AND METHOD FOR PRODUCING A SHAFT COMPONENT

(71) Applicant: ROLLS-ROYCE plc, London (GB)

(72) Inventors: Fiona Halliday, Derby (GB); Mark Spruce, Derby (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 17/881,225

(22) Filed: Aug. 4, 2022

(65) Prior Publication Data
US 2023/0054031 A1 Feb. 23, 2023

(30) Foreign Application Priority Data
Aug. 19, 2021 (GB) .................................. 2111881

(51) Int. Cl.
| | | |
|---|---|---|
| F02C 7/36 | (2006.01) | |
| B29C 70/28 | (2006.01) | |
| F16C 3/02 | (2006.01) | |
| F01D 5/06 | (2006.01) | |
| B29L 31/00 | (2006.01) | |

(52) U.S. Cl.
CPC ............. *F02C 7/36* (2013.01); *B29C 70/28* (2013.01); *F01D 5/06* (2013.01); *F16C 3/026* (2013.01); *B29L 2031/75* (2013.01); *F05D 2240/60* (2013.01); *F05D 2300/6034* (2013.01); *F05D 2300/614* (2013.01); *F16C 2208/02* (2013.01); *F16C 2240/30* (2013.01); *F16C 2360/23* (2013.01)

(58) Field of Classification Search
CPC ................. F16C 1/00–28; F16C 3/026; B29C 53/56–785
See application file for complete search history.

(56) References Cited

U.S. PATENT DOCUMENTS

| | | | |
|---|---|---|---|
| 4,248,062 A | | 2/1981 | McLain et al. |
| 4,725,060 A | * | 2/1988 | Iwanaga ................ A63B 53/10 |
| | | | 473/319 |
| 4,863,416 A | | 9/1989 | Gupta |
| 5,143,374 A | * | 9/1992 | Shibasaki ............. B29C 70/207 |
| | | | 273/DIG. 7 |

(Continued)

FOREIGN PATENT DOCUMENTS

| | | | | |
|---|---|---|---|---|
| CN | 112793670 A | * | 5/2021 | ........... B29C 53/566 |
| CN | 114483759 A | * | 5/2022 | |

(Continued)

OTHER PUBLICATIONS

Nov. 26, 2021 Search Report issued in British Patent Application No. GB2111881.5.

(Continued)

*Primary Examiner* — Topaz L. Elliott
(74) *Attorney, Agent, or Firm* — Oliff PLC

(57) ABSTRACT

A shaft component, which in particular can be connected or is connected to the input or output side of a gear box in a gas turbine engine, in particular an aircraft engine, wherein the shaft component has at least two regions comprising fiber reinforced plastic, with fibers in the at least two regions differing in their composition, their geometric properties, their density, their radial position, their axial position and/or in their fiber orientation in the shaft component.

16 Claims, 8 Drawing Sheets

(56) References Cited

U.S. PATENT DOCUMENTS

| | | | | |
|---|---|---|---|---|
| 5,556,677 | A * | 9/1996 | Quigley | D04C 3/48 |
| | | | | 156/169 |
| 5,897,447 | A * | 4/1999 | Nishihara | A63B 49/10 |
| | | | | 473/535 |
| 5,996,521 | A * | 12/1999 | Kitano | E04C 3/28 |
| | | | | 114/90 |
| 8,147,937 | B2 * | 4/2012 | Brisson | B29C 70/088 |
| | | | | 428/34.1 |
| 2009/0038435 | A1 | 2/2009 | Lunin | |
| 2010/0113170 | A1 | 5/2010 | Schreiber et al. | |
| 2011/0186211 | A1 * | 8/2011 | Fahey | B29C 70/543 |
| | | | | 156/227 |
| 2012/0094777 | A1 * | 4/2012 | Hechler-Stabbert | F02C 7/275 |
| | | | | 464/183 |
| 2012/0283029 | A1 * | 11/2012 | Lawrie | F16C 1/08 |
| | | | | 464/88 |
| 2014/0141894 | A1 | 5/2014 | Freund et al. | |
| 2015/0345541 | A1 * | 12/2015 | Sonnen | B29C 70/06 |
| | | | | 464/181 |
| 2016/0230805 | A1 | 8/2016 | Busch | |
| 2020/0165981 | A1 | 5/2020 | Schreiber et al. | |
| 2020/0166005 | A1 | 5/2020 | Schreiber et al. | |
| 2021/0156415 | A1 * | 5/2021 | Poster | F16C 3/026 |

FOREIGN PATENT DOCUMENTS

| | | | | |
|---|---|---|---|---|
| DE | 202004005380 | U1 * | 7/2004 | B63H 23/34 |
| DE | 102010048717 | A1 * | 4/2012 | F16C 1/02 |
| DE | 102016122574 | A1 * | 5/2018 | |
| EP | 0768472 | A2 * | 9/1996 | B63H 23/34 |
| GB | 1274568 | A | 5/1972 | |
| GB | 2063209 | A | 6/1981 | |

OTHER PUBLICATIONS

Jan. 3, 2023 Extended Search Report issued in European Patent Application No. 22187797.0.

* cited by examiner

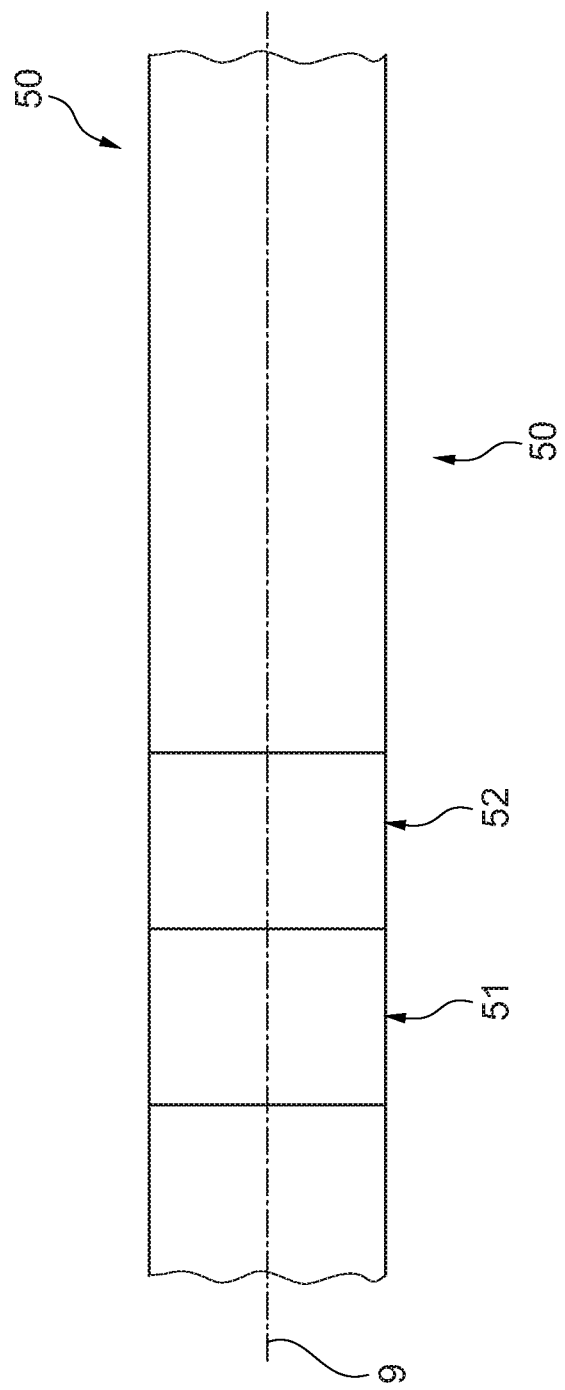

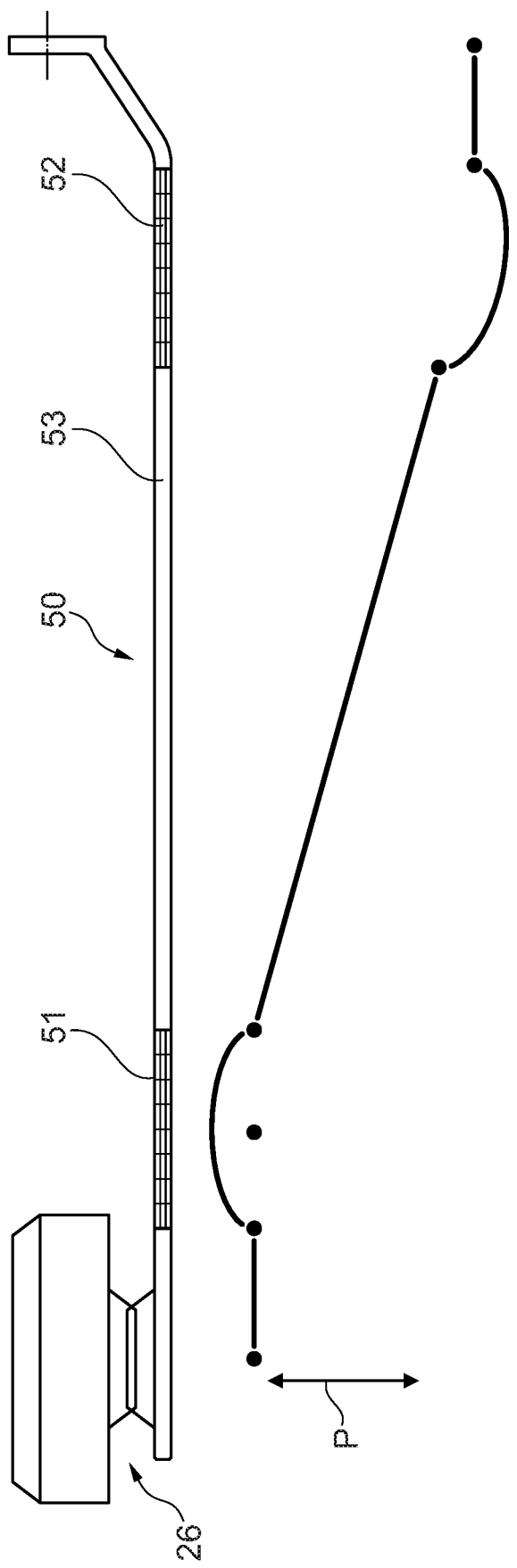
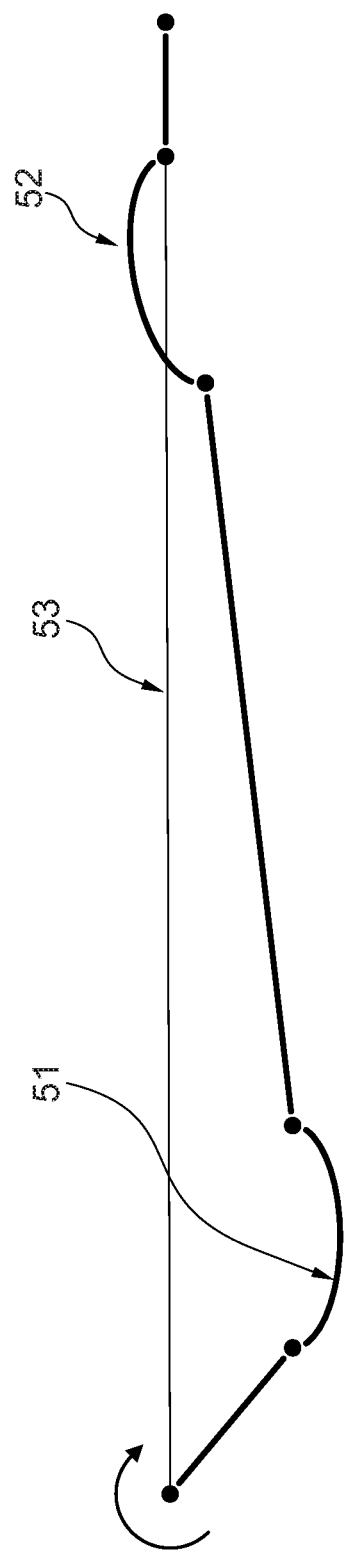
Fig. 9B
Fig. 9C

SHAFT COMPONENT AND METHOD FOR PRODUCING A SHAFT COMPONENT

CROSS-REFERENCE TO RELATED APPLICATIONS

This specification is based upon and claims the benefit of priority from United Kingdom patent application number GB 2111881.5 filed on Aug. 19, 2021, the entire contents of which is incorporated herein by reference.

BACKGROUND

Field of the Disclosure

The present disclosure relates to a shaft component, e.g. for a gas turbine engine, more particularly a shaft component that can be connected or is connected to the input or output side of a gear box of a gas turbine aircraft engine.

Description of the Related Art

In gas turbine engines, in particular in geared fan engines of aircraft, epicyclic gear boxes (planetary gear boxes) are used to reduce the relatively high speeds of a turbine for driving a fan of the engine. It is known in principle, for example from United States patent application US 2009/0038435 A1 to use composite materials in connection with gear boxes.

United States patent application US 2020/165981 A1 discloses undulated shaft components with a certain fiber arrangement.

There is however the problem of providing shafts which can in particular meet the special requirements for torque transmission.

SUMMARY OF THE DISCLOSURE

The present disclosure provides a shaft component, a method for producing a shaft component, and a gas turbine engine, as set out in the appended claims.

In a first aspect there is provided a shaft component, which in particular can be connected or is connected to the input or output side of a gear box in a gas turbine engine, in particular an aircraft engine. The shaft component has at least two regions comprising fiber reinforced plastic, with fibers and/or their matrix in the at least two regions differing in their composition, their geometric properties, their density, their radial position, their axial position and/or in their fiber orientation in the shaft component.

The complete set of fiber orientations within a composite often changes by layer and is generally referred to as a "Plybook" even if the method of manufacture is not the incremental laying on of sheets (also called plys) of fiber in different directions. The fiber directions are normally specified relative to a defined co-ordinate frame, which for a shaft is normally taken to be a cylindrical one aligned to the shaft axis and located at a center point of the shaft. This gives radial, tangential (or circumferential) and axial directions. Apart from the exception of 3D woven fiber composites, there is not normally any fibers arranged in the radial direction through a shaft section, which leaves the fibers all lying on cylinders or cones (or transitions between) in a 2D sense. The fiber direction is then completely defined by one angle—in this case measured to the axial axis projected onto the fiber cylinder or cone. Hence 0° refers to a fiber completely aligned to the axial shaft direction, and 90° refers to a fiber completely aligned to circumferential direction.

This regional design allows an implementation of tailored flexibility while managing dynamic behavior of the shaft component. The composite design will respect the criteria to avoid shaft whirl and undesirable vibration modes, possibly leading to a modification from the optimum solution for transmitting the torque and maintaining the lateral stiffness. The regional design also enables reduced space requirement due to elimination or reduction of geometric convolutions, such as bellows. Also, a reduction in weight can be achieved due to use of less dense material and more compact shaft design (reduced material due to removed convolutions).

In some embodiments in at least one of the regions, the fibers are arranged in an angular range of +/−40° to 50°, in particular of +/−42° to 48°, most particularly +/−45°, in relation to the main axis of rotation of the shaft component. It should be noted that the angular values given here, and elsewhere, are the angular directions which are predominantly present in the fiber layers. When a region is adjacent to another region with a different fiber orientation, there will be a short transitional zone while the fiber changes angle. These transitional zones are designed in such a way that the majority (>90%) of the fiber angle change is contained within an axial extant no greater than 10% of the shorter of the two adjacent regions.

This angular design is effective for balancing the internally generated axial loads created by the torque transmission through the composite. Using this symmetrically paired orientation of fibers produces the most efficient composite design to transmit torque loads. All the fibers deviate from the 0° direction by about 45°, which allows all the fibers to weakly contribute to the bending and axial stiffnesses of these sections, resulting in medium bending and axial stiffnesses.

Alternatively, in at least one of the regions the fibers are predominantly arranged in an angular range about 0° in relation to the main axis of rotation of the shaft component. This means that in this one region the fibers are arranged aligned with the rotational axis of the shaft component. This fiber orientation maximizes both the axial stiffness of the shaft and the bending stiffness of the shaft.

Alternatively, in at least one of the regions the fibers are arranged in an angular range about 90° in relation to the main axis of rotation of the shaft component. Angles above 90° are just the opposite hand of the angles below 90°. This means that in this one region the fibers are arranged mainly circumferentially to the rotational axis of the shaft component. This fiber orientation minimizes the axial stiffness and bending stiffness of the shaft. By intentionally designing two distinct sections with these properties in the shaft, the bending stiffness can be reduced to very low levels while preserving the torsional and axial shaft stiffnesses within the design limits.

Furthermore, in one embodiment the shaft component has a non-constant or non-uniform diameter along the axis of rotation. One example for such a shaft component is an undulant shaft having bellow sections. The use of composite fibers with the angles mentioned above will reduce the need for undulations or bellows. In most embodiments the shaft can be completely smooth, but in some other shaft embodiments which have requirements of very low bending stiffness, the undulations or bellows might need to be retained. However, the undulations or bellows will be of much smaller height.

One property which can vary between the at least two regions are the ratios between resin and fibers. The ratio of fiber to resin within composites is normally characterized using the volume fiber fraction of the total composite, with a typical value in the range 55% to 65%. While it is possible with some composite methods of manufacture to create lower fiber fractions to intentionally give reduced stiffness properties, this is typically part of the material system development and not explicitly part of the design.

Similarly, it is also possible that fiber bundle counts and individual fiber diameters are different in the at least two different regions. Common organic composite method of manufacture utilize very small diameter fibers to allow creation of the curved surfaces contained within the final products without damaging the fibers, in the range of 4 to 10 microns. These fibers often create composites which have significantly lower stiffness and strength properties under the effect of compressive loads compared to under tensile loads. Torque transmission through shafts in essence creates a pair of balanced tension and compression loads within the shaft and this difference between tensile and compressive behavior is hence undesirable. Use of both larger diameter fibers and/or larger bundles of fiber in the composite manufacturing process can reduce the difference between the tensile and compressive properties; this is typically part of the material system development and not explicitly part of the design.

In some embodiments, the angle of the fiber arrangement varies radially in the at least two different regions. This means that the wall of the shaft component can comprise fibers arranged in different angular patterns.

Furthermore, at least one woven material, in particular a ribbon is used in least one of the two different regions. The use of woven materials is especially beneficial on the composite outer layers, as the fibers are already tied together before the curing of the composite.

In some embodiments it is possible, to make the shaft component "smoother", the ratio between the largest diameter and the smallest diameter of the shaft component is less than 1.1.

In some embodiments, at least one first region comprises fibers with orientations going from 40° to 50° to 65° to 90° and at least one second region with fibers with orientations going from 0° to 50° and the at least one first region being adjacent to the at least one second region.

As torques in geared turbofan engines can be large, the shaft component in one embodiment is designed as part of a drive shaft for a fan.

The fiber-reinforced plastic can e.g. comprise carbon fibers, metal filaments, synthetic fibers, in particular aramids and/or ceramic fibers.

In a second aspect there is provided a method for producing a shaft component, which can be connected or is connected to the input or output side of a gear box in a gas turbine engine, wherein fibers are incorporated in a matrix, the fibers and/or their matrix being incorporated in the shaft component so that in at least two regions differ in their composition, their geometric properties, their density, their radial position, their axial position and/or in their fiber orientation in the shaft component.

In some embodiments a winding method, a braiding method, a Tailored Fiber Placement (TFP) method or a combination of the methods is used for incorporating the fibers in the matrix or in the shaft component.

In some embodiments the fiber-reinforced plastic comprises carbon fibers, metal filaments and/or synthetic fibers.

In some embodiments the fiber-reinforced plastic comprises aramids and/or ceramic fibers.

In a third aspect there is provided a gas turbine engine for an aircraft, the gas turbine engine comprising: an engine core comprising a turbine, a compressor, and a core shaft connecting the turbine to the compressor; a fan, which is positioned upstream of the engine core, wherein the fan comprises a plurality of fan blades; and a gear box, which can be driven by the core shaft, wherein the fan can be driven by means of the gear box at a lower rotational speed than the core shaft, wherein a shaft component according to the first aspect is connected to the gear box as part of a drive shaft for the fan.

In some embodiments the shaft component is connected to the gear box on the output side of the gear box.

The gas turbine engine may be an aircraft engine. Such a gas turbine engine may comprise an engine core comprising a turbine, a combustor, a compressor, and a core shaft connecting the turbine to the compressor. Such a gas turbine engine may comprise a fan (with fan blades) which is positioned upstream of the engine core.

Arrangements of the present disclosure may be particularly, although not exclusively, advantageous for geared fans, which are driven via a gear box. Accordingly, the gas turbine engine may comprise a gear box which is driven via the core shaft and the output of which drives the fan in such a way that it has a lower rotational speed than the core shaft. The input to the gear box may be effected directly from the core shaft, or indirectly via the core shaft, for example via a spur shaft and/or spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, the second compressor, and the second core shaft may be arranged to rotate at a higher speed than the first core shaft.

In such an arrangement, the second compressor may be positioned axially downstream of the first compressor. The second compressor may be arranged to receive (for example directly receive, for example via a generally annular duct) a flow from the first compressor.

The gear box may be designed to be driven by the core shaft that is configured to rotate (for example in use) at the lowest rotational speed (for example the first core shaft in the example above). For example, the gear box may be designed to be driven only by the core shaft that is configured to rotate (for example in use) at the lowest rotational speed (for example only by the first core shaft and not the second core shaft in the example above). Alternatively, the gear box may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor if a second compressor is provided. By way of a further example, the flow at the exit of the compressor may be supplied to the inlet of the second turbine if a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of incidence may be variable). The row of rotor blades and the row of stator blades may be axially offset with respect to one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to one another.

Each fan blade may have a radial span extending from a root (or a hub) at a radially inner location which is flowed over by gas, or from a position of 0% span, to a tip with a 100% span. The ratio of the radius of the fan blade at the hub to the radius of the fan blade at the tip may be less than (or of the order of magnitude of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by any two values in the previous sentence (i.e. the values may form upper or lower bounds). These ratios can commonly be referred to as the hub-to-tip ratio. The radius at the hub and the radius at the tip may both be measured at the leading edge (or the axially forwardmost edge) of the blade. The hub-to-tip ratio refers, of course, to that portion of the fan blade which is flowed over by gas, i.e. the portion radially outside any platform.

The radius of the fan may be measured between the engine centerline and the tip of the fan blade at its leading edge. The diameter of the fan (which can generally be double the radius of the fan) can be larger than (or of the order of magnitude of): 250 cm (approximately 100 inches), 260 cm (approximately 102 inches), 270 cm (approximately 105 inches), 280 cm (approximately 110 inches), 290 cm (approximately 115 inches), 300 cm (approximately 120 inches), 310 cm (approximately 122 inches), 320 cm (approximately 125 inches), 330 cm (approximately 130 inches), 340 cm (approximately 135 inches), 350 cm (approximately 138 inches), 360 cm (approximately 140 inches), 370 cm (approximately 145 inches), 380 cm (approximately 150 inches) or 390 cm (approximately 155 inches). The fan diameter may be in an inclusive range bounded by any two of the values in the previous sentence (i.e. the values may form upper or lower bounds).

The speed of the fan may vary in operation. Generally, the speed is lower for fans with a larger diameter. Purely as a non-limiting example, the rotational speed of the fan under cruise conditions may be less than 2500 rpm, for example less than 2300 rpm. Purely as a further non-limiting example, the rotational speed of the fan under cruise conditions for an engine having a fan diameter in the range of from 250 cm to 300 cm (for example 250 cm to 280 cm) may also be in the range of from 1700 rpm to 2500 rpm, for example in the range of from 1800 rpm to 2300 rpm, for example in the range of from 1900 rpm to 2100 rpm. Purely as a further non-limiting example, the speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading under cruise conditions may be more than (or of the order of magnitude of): 0.3, 0.31, 0.32, 0.33, 0.34, 0.35, 0.36, 0.37, 0.38, 0.39, or 0.4 (wherein all units in this passage are $Jkg^{-1} K^{-1}/(ms^{-1})^2$). The fan tip loading may be in an inclusive range bounded by any two of the values in the previous sentence (i.e. the values may form upper or lower bounds).

Gas turbine engines according to the present disclosure can have any desired bypass ratio, wherein the bypass ratio is defined as the ratio of the mass flow rate of the flow through the bypass duct to the mass flow rate of the flow through the core under cruise conditions. In the case of some arrangements, the bypass ratio can be more than (or of the order of magnitude of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by an engine nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). As a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein under cruise conditions may be less than (or of the order of): 110 N kg$^{-1}$ s, 105 N kg$^{-1}$ s, 100 N kg$^{-1}$ s, 95 N kg$^{-1}$ s, 90 N kg$^{-1}$ s, 85 N kg$^{-1}$ s or 80 N kg$^{-1}$ s. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely as a non-limiting example, a gas turbine as described and/or claimed herein can be capable of generating a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

In use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or of the order of): 1400 K, 1450 K, 1500 K, 1550 K, 1600 K or 1650 K. The TET at cruising speed may be in an inclusive range bounded by any two of the values in the previous sentence (i.e. the values may form upper or lower bounds). The maximum TET in the use of the engine can be at least (or of the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET can occur, for example, under a high thrust condition, for example under a maximum take-off thrust (MTO) condition.

A fan blade and/or aerofoil portion of a fan blade described and/or claimed herein may be produced from any suitable material or combination of materials. For example at least a part of the fan blade and/or aerofoil may be produced at least in part from a composite, for example a metal matrix composite and/or an organic matrix composite, such as carbon fiber. As a further example, at least a part of the fan blade and/or aerofoil may be produced at least in part from a metal, such as e.g. a titanium based metal or an aluminum based material (such as e.g. an aluminum-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely as an example, the fan blade may have a carbon-fiber or aluminum based body (such as an aluminum-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage with a corresponding slot in the hub (or disk). Purely as an example, such a fixture may be in the form of a dovetail that may slot into and/or be brought into engagement with a corresponding slot in the hub/disk in order to fix the fan blade to the hub/disk. As a further example, the fan blades may be formed integrally with a central portion. Such an arrangement can be referred to as a blisk or a bling. Any suitable method can be used to produce such a blisk or such a bling. For example, at least a part of the fan blades may be machined from a block and/or at least part of the fan blades may be attached to the hub/disk by welding, such as e.g. linear friction welding.

The gas turbine engines described and/or claimed herein may or may not be provided with a variable area nozzle (VAN). Such a variable area nozzle may allow the exit area of the bypass duct to be varied in operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions may be conventionally defined as the conditions during the middle part of the flight, for example the conditions experienced by the aircraft and/or the engine between (in terms of time and/or distance) the end of the ascent and the start of the descent.

Purely as an example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any speed within these ranges may be the cruise condition. For some aircraft, the cruise condition may be outside these ranges, for example below Mach 0.7 or above Mach 0.9.

Purely as an example, the cruise conditions may correspond to standard atmospheric conditions at an altitude that is in the range of from 10 000 m to 15 000 m, for example in the range of from 10 000 m to 12 000 m, for example in the range of from 10 400 m to 11 600 m (about 38 000 ft), for example in the range of from 10 500 m to 11 500 m, for example in the range of from 10 600 m to 11 400 m, for example in the range of from 10 700 m (about 35 000 ft) to 11 300 m, for example in the range of from 10 800 m to 11 200 m, for example in the range of from 10 900 m to 11 100 m, for example of the order of magnitude of 11 000 m. The cruise conditions may correspond to standard atmospheric conditions at any given altitude in these ranges.

Purely as an example, the cruise conditions may correspond to the following: a forward Mach number of 0.8, a pressure of 23 000 Pa and a temperature of −55° C.

As used anywhere herein, "cruising speed" or "cruise conditions" can mean the aerodynamic design point. Such an aerodynamic design point (or ADP) may correspond to the conditions (comprising, for example, the Mach number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described in relation to any one of the above aspects may be applied to any other aspect unless they are mutually exclusive. Furthermore, any feature or any parameter described here may be applied to any aspect and/or combined with any other feature or parameter described here, unless they are mutually exclusive.

BRIEF DESCRIPTION OF THE DRAWINGS

The present disclosure will be explained in more detail on the basis of exemplary embodiments with reference to the accompanying drawings in which:

FIG. 4 shows a schematic view an embodiment of a shaft component with two regions of different fiber properties;

FIG. 9B shows a schematic representation of a shaft component with two regions which fiber angle orientations differ from a third region;

FIG. 9C shows the center line of the embodiment of FIG. 9B for a different load case.

Figure 1:
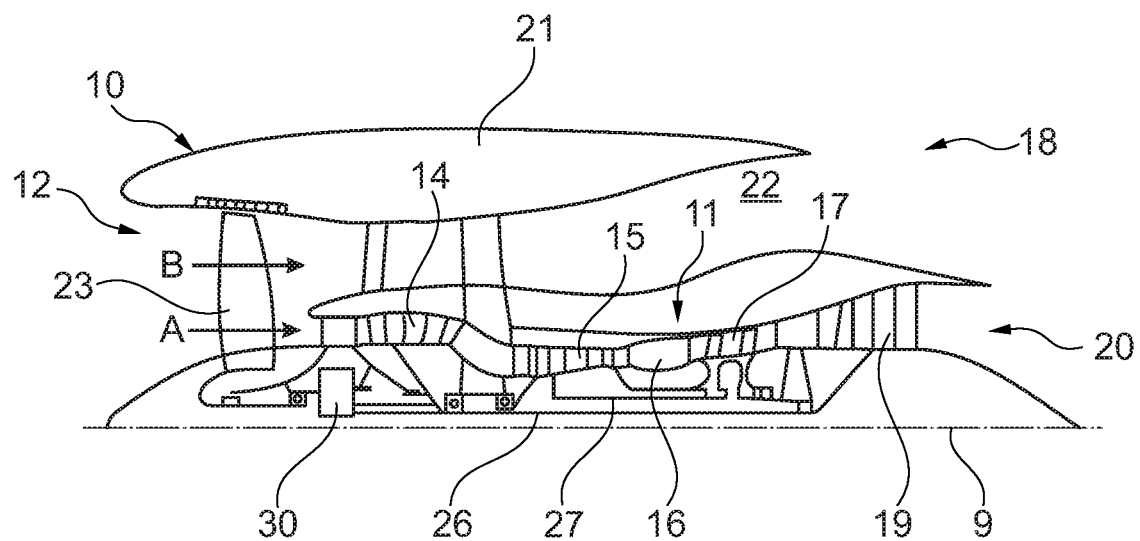
FIG. 1 shows a sectional lateral view of a gas turbine engine.

The following table lists the reference numerals used in the drawings with the features to which they refer:

| Ref no. | Feature |
| --- | --- |
| A | Core airflow |
| B | Bypass airflow |
| P | Parallel offset |
| 9 | Main axis of rotation |
| 10 | Gas turbine engine |
| 11 | Enine core |
| 12 | Air inlet |
| 14 | Low-pressure compressor |
| 15 | High-pressure compressor |
| 16 | Combustion device/equipment |
| 17 | High-pressure turbine |
| 18 | Bypass thrust nozzle |
| 19 | Low pressure turbine |
| 20 | Core thrust nozzle |
| 21 | Engine nacelle |
| 22 | Bypass duct |
| 23 | Fan |
| 24 | Stationary supporting structure |
| 26 | Shaft |
| 27 | Connecting shaft |
| 28 | Sun gear |
| 30 | Gear box |
| 32 | Planet gears |
| 34 | Planet carrier |
| 36 | Linkage |
| 38 | Ring gear |
| 40 | Linkage |
| 50 | Shaft component |
| 51 | First region comprising fiber reinforced plastic |
| 52 | Second region comprising fiber reinforced plastic |
| 53 | Third region comprising fiber reinforced plastic |
| 54 | Undulation/bellow |
| 60 | Fiber |
| 71 | First undulant section |
| 72 | Second undulant section |
| 73 | Third undulant section |

DETAILED DESCRIPTION OF THE DISCLOSURE

Aspects and embodiments of the present disclosure will now be discussed with reference to the accompanying figures. Further aspects and embodiments will be apparent to those skilled in the art.

FIG. 1 illustrates a gas turbine engine 10 having a main axis of rotation 9. The gas turbine engine 10 comprises an air inlet 12 and a fan 23 that generates two air flows: a core air flow A and a bypass air flow B. The gas turbine engine 10 comprises a core 11 that receives the core air flow A. When viewed in the order corresponding to the axial direction of flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air exhausted from the high-pressure compressor 15 is directed into the combustion device 16, where it is mixed with fuel and the mixture is combusted. The resultant hot combustion products then expand through, and thereby drive, the high-pressure and low-pressure turbines 17, 19 before being expelled through the core thrust nozzle 20 to provide some thrust force. The high-pressure turbine 17 drives the high-pressure compressor 15 by means of a suitable connection shaft 27. The fan 23 generally provides the major part of the propulsive thrust. The epicyclic planetary gear box 30 is a reduction gear box.

Figure 2:
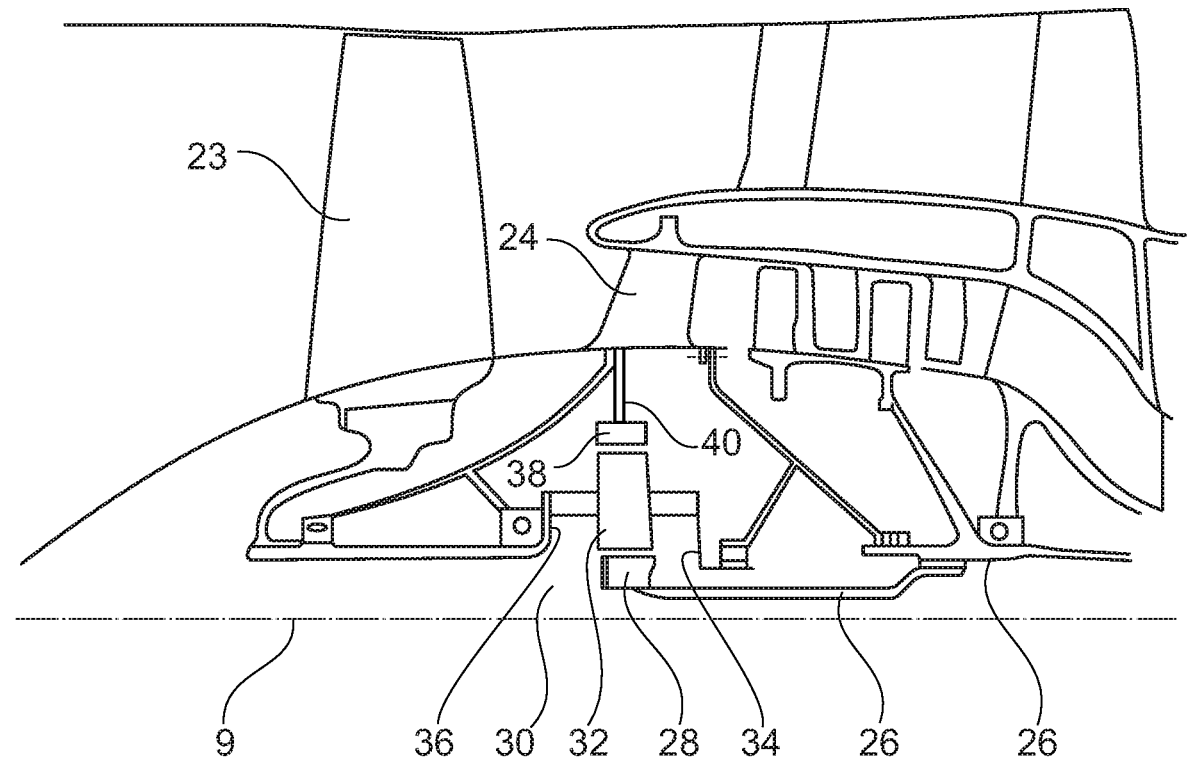
FIG. 2 shows a close-up sectional lateral view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary gear box 30. Radially to the outside of the sun gear 28 and meshing therewith are a plurality of planet gears 32 that are coupled to one another by a planet carrier 34. The planet carrier 34 guides the planet gears 32 in such a way that they circulate synchronously around the sun gear 28 whilst enabling each planet gear 32 to rotate about its own axis. The planet carrier 34 is coupled via linkages 36 to the fan 23 in order to drive its rotation about the engine axis 9. Radially to the outside of the planet gears 32 and meshing therewith is an annulus or ring gear 38 that is coupled, via linkages 40 to a stationary supporting structure 24.

Note that the terms "low-pressure turbine" and "low-pressure compressor" as used herein may be taken to mean the lowest-pressure turbine stage and lowest-pressure compressor stage (i.e. not including the fan 23) respectively and/or the turbine and compressor stages that are connected together by the connecting shaft 26 with the lowest rotational speed in the engine (i.e. not including the gear-box output shaft that drives the fan 23). In some literature, the "low-pressure turbine" and "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

Figure 3:
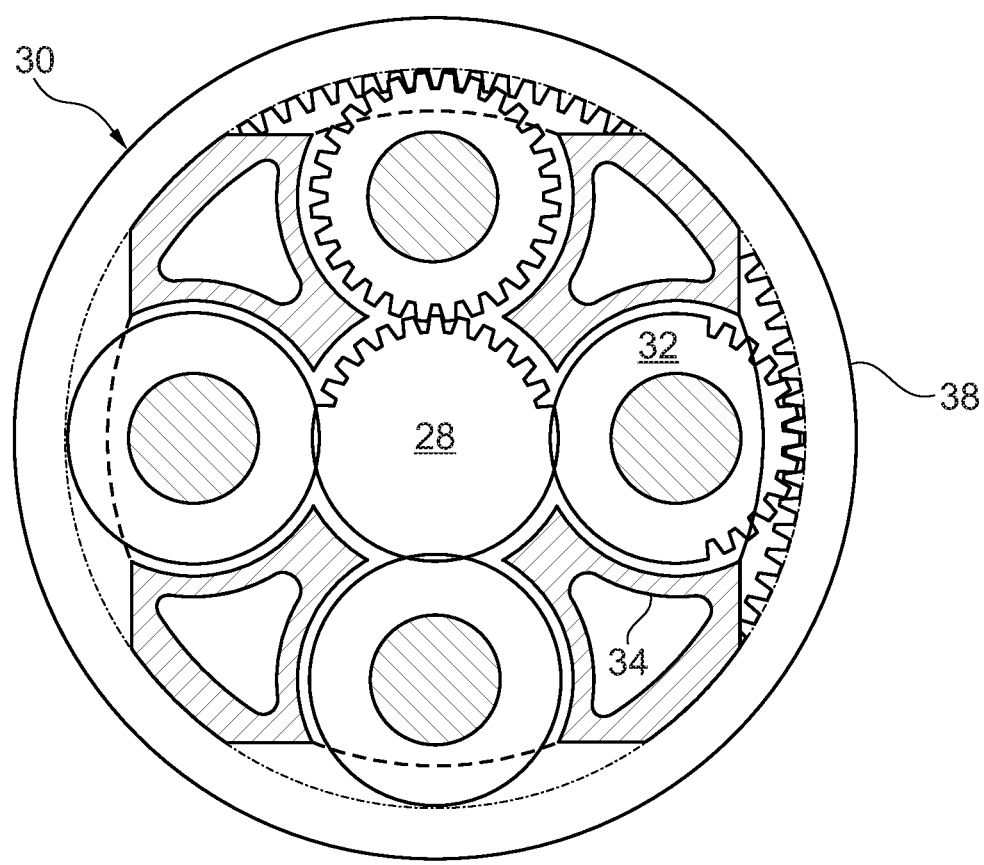
FIG. 3 shows a partially cut-away view of a gear box for a gas turbine engine.

The epicyclic planetary gear box 30 is shown by way of example in greater detail in FIG. 3. The sun gear 28, planet gears 32 and ring gear 38 in each case comprise teeth on their periphery to allow intermeshing with the other gearwheels. However, for clarity, only exemplary portions of the teeth are illustrated in FIG. 3. Although four planet gears 32 are illustrated, it will be apparent to a person skilled in the art that more or fewer planet gears 32 can be provided. Practical applications of an epicyclic planetary gear box 30 generally comprise at least three planet gears 32.

The epicyclic planetary gear box 30 illustrated by way of example in FIGS. 2 and 3 is a planetary gear box in which the planet carrier 34 is coupled to an output shaft via linkages 36 with the ring gear 38 being fixed. However, any other suitable type of planetary gear box 30 may be used. As a further example, the planetary gear box 30 may be a star arrangement, in which the planet carrier 34 is held fixed, with the ring gear (or annulus) 38 allowed to rotate. In such an arrangement, the fan 23 is driven by the ring gear 38. As a further alternative example, the gear box 30 can be a differential gear box in which the ring gear 38 and the planet carrier 34 are both allowed to rotate.

It is self-evident that the arrangement shown in FIGS. 2 and 3 is merely an example, and various alternatives fall within the scope of protection of the present disclosure. Purely by way of example, any suitable arrangement may be used for locating the gear box 30 in the gas turbine engine 10 and/or for connecting the gear box 30 to the gas turbine engine 10. As a further example, the connections (e.g. the linkages 36, 40 in the example of FIG. 2) between the gear box 30 and other parts of the gas turbine engine 10 (such as e.g. the input shaft 26. the output shaft and the fixed structure 24) may have a certain degree of stiffness or flexibility. As a further example, any suitable arrangement of the bearings between rotating and stationary parts of the gas turbine engine 10 (for example between the input and output shafts of the gear box and the fixed structures, such as the gear-box casing) may be used, and the present disclosure is not limited to the exemplary arrangement of FIG. 2. For example, where the gear box 30 has a star arrangement (described above), a person skilled in the art would readily understand that the arrangement of output and supporting linkages and bearing positions would usually be different than that shown by way of example in FIG. 2.

Accordingly, the present disclosure extends to a gas turbine engine having any arrangement of types of gear box (for example star or epicyclic-planetary), supporting structures, input and output shaft arrangement, and bearing locations.

Optionally, the gear box may drive additional and/or alternative components (e.g. the intermediate-pressure compressor and/or a booster compressor).

Other gas turbine engines to which the present disclosure can be applied may have alternative configurations. For example, engines of this type may have an alternative number of compressors and/or turbines and/or an alternative number of connecting shafts. As a further example, the gas turbine engine shown in FIG. 1 has a split flow nozzle 20, 22 meaning that the flow through the bypass duct 22 has its own nozzle that is separate from and radially outside the core thrust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the example described relates to a turbofan engine, the disclosure may be applied, for example, to any type of gas turbine engine, such as e.g. an open-rotor engine (in which the fan stage is not surrounded by an engine nacelle) or a turboprop engine. In some arrangements, the gas turbine engine 10 may not comprise a gear box 30.

The geometry of the gas turbine engine 10 and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

In the following, several embodiments of shaft components 50 to be used in connection with the input and/or output side of the gear box 30 are described in an exemplary way.

The figurative representations in FIGS. 4 to 7 are considered schematic to show that the shaft components 50 can have at least two regions 51, 52, 53 comprising fiber reinforced plastic, the fibers 60 and/or their matrix in the at least two regions 51, 52, 53 differ in their composition, their geometric properties, their density, their radial position, their axial position and/or in their fiber orientation arrangement in the shaft component 50. This can for example mean that the ratio between the resin and the fibers is different in at least two regions 51, 52.

For the sake of simplicity, all shaft components 50 in FIGS. 4 to 7 are shown as straight tubes, i.e. devices having constant inner and outer diameters. The embodiments are not limited to such tubular devices, as is shown in context of FIG. 8. Therefore, all features discussed in the context of shaft components 50 with constant diameters can also be applied to shaft components 50 having e.g. undulant walls (i.e. having bellows 54) as shown in FIG. 8.

The shaft component 50 can also comprise e.g. conical parts or flanges. At the ends of the shaft components 50 (not shown here), metallic end fittings can be positioned. The attachment of the end fittings can effected by adhesive and/or mechanical means. The shaft coupling can be e.g. a spline or a curvic coupling.

By deliberately varying the properties of the fibers e.g. in their axial position along the shaft component 50, at least two regions 51, 52, 53 are created in the shaft component 50 having different mechanical properties. This is a deliberate introduction of an anisotropy along the axial direction of the shaft component 50 that can be tailored to achieve specific design objectives.

As shown in FIG. 4, a first region 51 can have a fiber arrangement or fiber material deliberately softening this region 51 against torsional loads. Whereas a different second region 52 can be stiffer against torsional loads. In FIG. 4 the regions 51, 52 are adjacent to each other, which does not always have to be the case.

Figure 6:
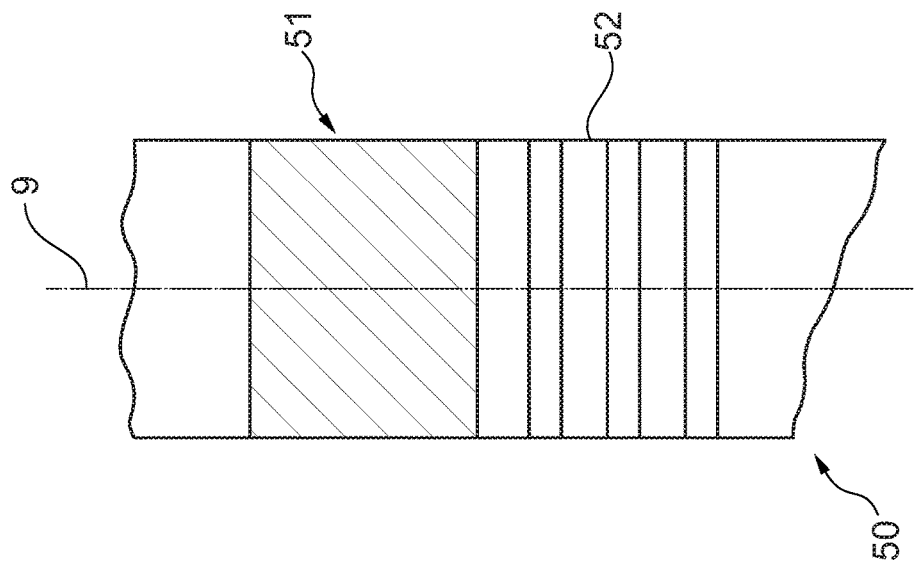
FIG. 6 shows a schematic view of a further embodiment with two regions of different angular fiber arrangements.

It is possible that e.g. the shaft component 50 has uniform fiber properties but for two regions 51, 52 distributed along the axis. As shown in the context of FIG. 6, more than two regions 51, 52, 53 are also possible, giving a wide range of design choices for optimizations.

The regions 51, 52, 53 can differ e.g. in the orientation of the fibers 60 resulting in differences in the behavior. In addition or alternatively, different fibers 60 could be used. Different geometric properties (e.g. fiber diameters, fiber lengths) have an effect on the mechanical properties of the shaft component 50.

Also, the ratio of resin and fibers 60 can be different in different regions 51, 52, 53 of the shaft component 50.

Figure 5:
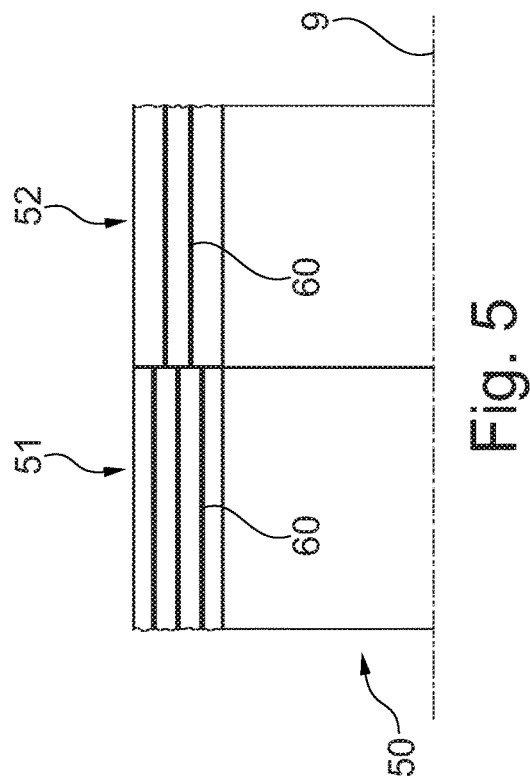
FIG. 5 shows a radial section through the wall of a shaft component.

In FIG. 5 it is shown that radial variation in the fibers 60 can be used as well. In the embodiment shown, the first region 51 comprises three layers of fibers 60, the second layer 52 comprises two layers of fibers. As in the embodiment of FIG. 4, the regions 51, 52 are axially adjacent.

Figure 5A:
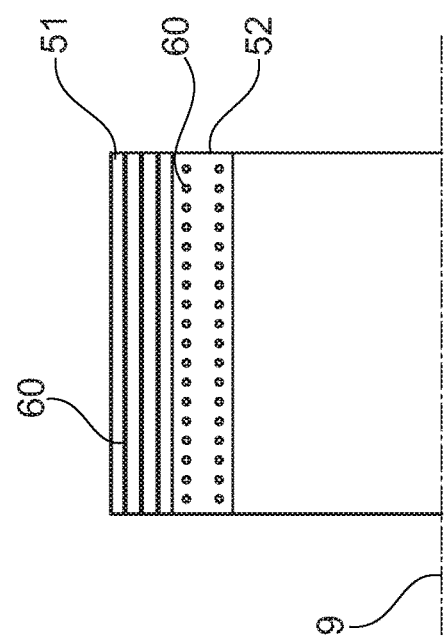
FIG. 5A shows a variation of the embodiment in FIG. 5 with two different regions in radial positions.

In FIG. 5A it is shown that the regions 51, 52 can also be positioned radially. The radially outer region 51 has fibers 60 oriented axially; the radially inner region 52 has fibers 60 in circumferential orientation. Obviously, there could be more than two regions 51, 52 arranged radially.

It is not mandatory, that different regions 51, 52, 53 have to have the same axial lengths, as shown in FIG. 5A. In other embodiments, the regions 51, 52, 53 might have different axial lengths.

In FIG. 6 an embodiment of a shaft component 50 with two adjacent regions 51, 52 is shown, each region having different orientations of the fibers 60. In the first region 51, the fibers 60 are wound under 45°/−45°, in the second region 52 the fibers 60 are wound under 90° to the rotational axis 9 of the shaft component 50.

Figure 7:
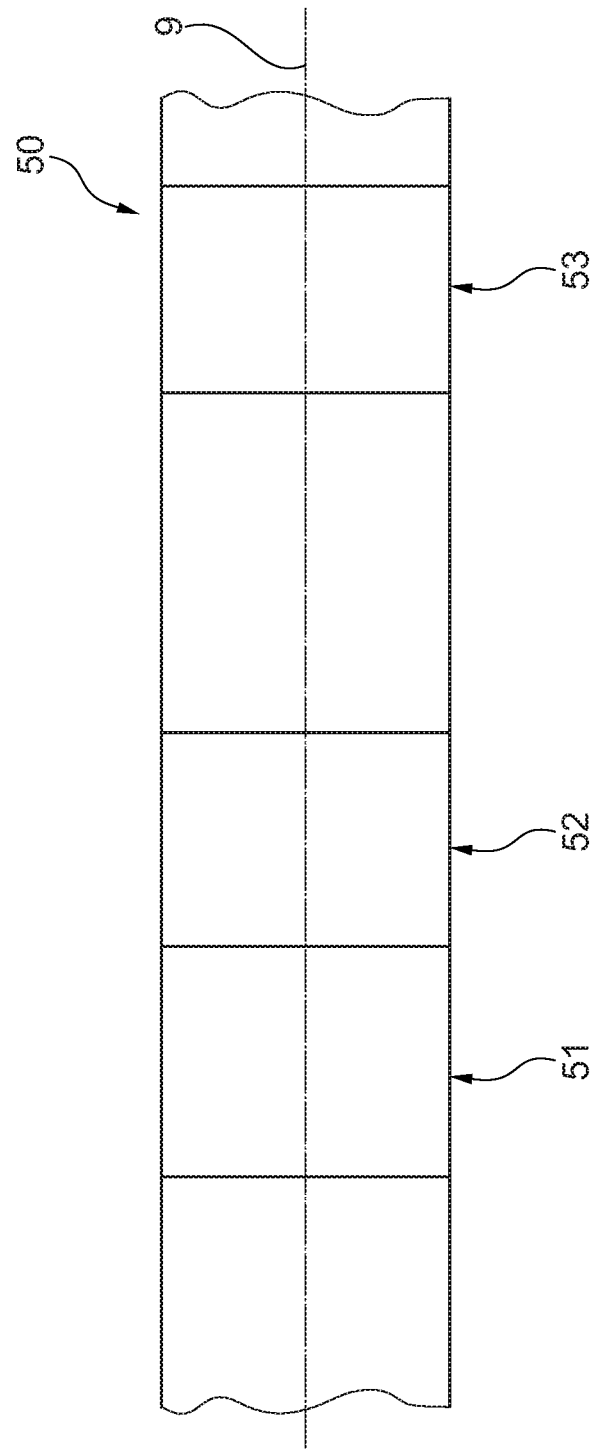
FIG. 7 shows a schematic view of a further embodiment with three regions having different fiber properties.
Figure 8:
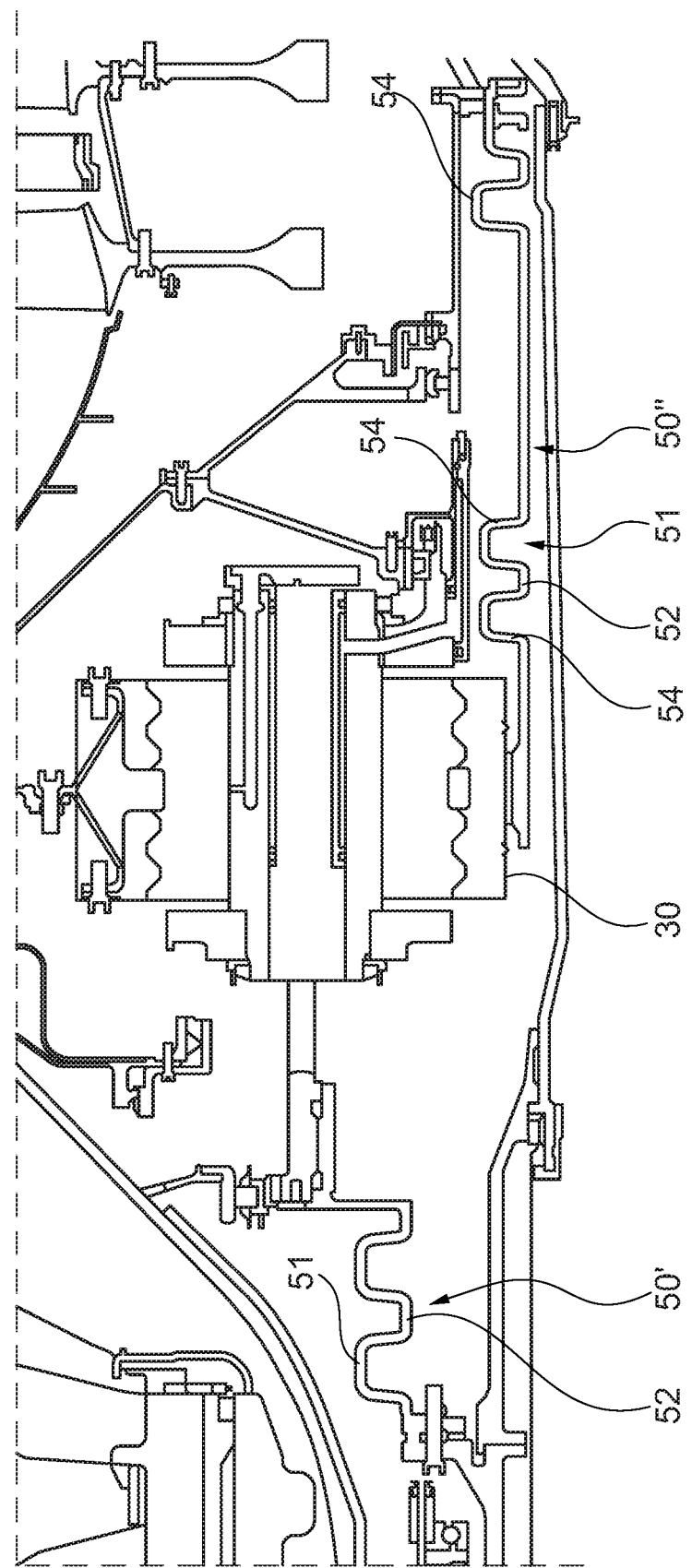
FIG. 8 shows sectional view of a shaft arrangement with a gear box.

In FIG. 7 an embodiment of a shaft component 50 with three regions 51, 52, 53 is shown. The first and the second region 51, 52 are axially adjacent. The third region 53 is set axially apart.

In FIG. 8 two shaft components 50', 50" are shown, both being undulant shafts, i.e. shafts having some convolutions or bellows. The first shaft component 50' is on the output side of the gear box 50. This first shaft component 50' comprises two bellows 54. The second shaft component 50" is on the input side of the gear box 30. The second shaft component 50" comprises three bellows 54. The bellows 54 can introduce a certain lateral flexibility and torsional stiffness. Both shaft components 50', 50" comprise two different regions 51, 52 with different properties related to the fibers 60.

Since the mechanical properties of the shaft components 50 can be mechanically tailored by using regions 51, 52, 53 with different properties, the sizing of the bellows 54 (also responsible for mechanical properties of the shaft component) can be reduced or even substituted by the regions 51, 52, 53 having different properties each.

In following, some of the different properties, to be used in different regions 51, 52, 53 are listed in an exemplary way.

- Regions 51, 52, 53 having different fiber directions in different layers—parallel and perpendicular to shaft axis 9, resulting in different stiffness.
- Regions 51, 52, 53 having different fiber directions in different layers—at different angles and hand of twist relative to the shaft axis 9, resulting in different stiffness.
- Regions 51, 52, 53 having different fiber packing densities in different layers resulting in different density/stiffness.
- Regions 51, 52, 53 having different fiber materials in different layers different resulting in different strength/stiffness.
- Regions 51, 52, 53, having different fiber diameters or cross sections in different layers resulting in different stiffness/second moment of inertia.
- Regions 51, 52, 53 having a combination of woven fiber ribbon and individual fibers in different layers resulting in a combination of multidirectional and unidirectional properties.
- Regions 51, 52, 53 having a combination of fiber or ribbon wound into a shaft form while 'dry', then impregnated with the resin matrix.
- Regions 51, 52, 53 having a fiber or ribbon wound into a shaft form when pre-impregnated with resin, then cured using heat.

Even though the embodiments of the shaft component 50 have been exemplary shown in the context of a geared turbo engine 10, the shaft components 50 can also be used in other contexts. Similar concepts may be of use on other components/engine designs where tailored stiffness is required, for example flexible couplings or shafts in the accessory drive train, e.g. to drive the accessory gearbox, oil pumps, fuel pumps, generators. These may be positioned on the engine main line, or off the engine mainline (e.g. on the intercase or fan case).

In the following some embodiments are described in which certain regions 51, 52, 53 have a certain fiber orientation.

The following table shows assignments of different composite shaft sections (Type A to E) with certain fiber orientations (i.e. ranges of angles).

| Section type | Fiber Orientation (from shaft central axis projected into composite section) | Axial Stiffness and Strength Property | Bending Stiffness and Strength Property | Torsional Stiffness and Strength Property |
|---|---|---|---|---|
| A | 0° to 25° especially 0° | Very High | Very High | Very Low |
| B | 25° to 40° | High | High | Medium |
| C | 40° to 50° especially 45° | Medium | Medium | Very High |
| D | 50° to 65° | Low | Low | Medium |
| E | 65° to 90° especially 90° | Very Low | Very Low | Very Low |

Each of the different fiber orientations reacts differently to axial, bending and torsional loads, as indicated in above table.

The axial and bending stiffness are highest with relatively small fiber orientation angles and decreases with increasing fiber orientation angles.

The torsional stiffness is highest around a fiber orientation angle of 45° and falls off towards smaller and higher fiber orientation angles.

When describing fiber orientations, only one of the matched pair of orientations is listed. The region will be made of fibers at both the quoted angle and its matched pair with a negative sign.

So a region of e.g. section type C with 45° refers to a shaft region with an equal amount of fiber in the +45° and the −45° directions.

These pair of angles can be considered as right handed helix and left handed helix angles. The equal amount of fiber is important as it produces a composite with a symmetric The fiber orientations of 0° and 90° are exceptions to this as for these two angles, the negative value is the same as the positive. Hence 0° is with all the fibers axially aligned and 90° is with all the fibers circumferentially aligned to the shaft.

Note that although both the stiffness and strength of the various section types listed in the table above follow the trend as tabulated, the proportions of the stiffness and strength changes will differ in magnitude.

Each region 51, 52, 53 does not have to be exclusively composed of fibers in one pair of orientations, so a composite can be made with a mixture of different angles in different layers to give some merged combination of the stiffness and strength properties.

It is possible that a composite shaft component 50 can been designed with just one region 51 (e.g. designated A-C or B-C) formed from a mixture of section type A or B to give adequate bending stiffness to increase the modal frequency and avoid whirling vibrations, combined with a section type C to give adequate torsional strength. The total composite thickness and the mixture proportions of a given design would be determined to meet the specific requirements of the shaft.

Figure 9A:
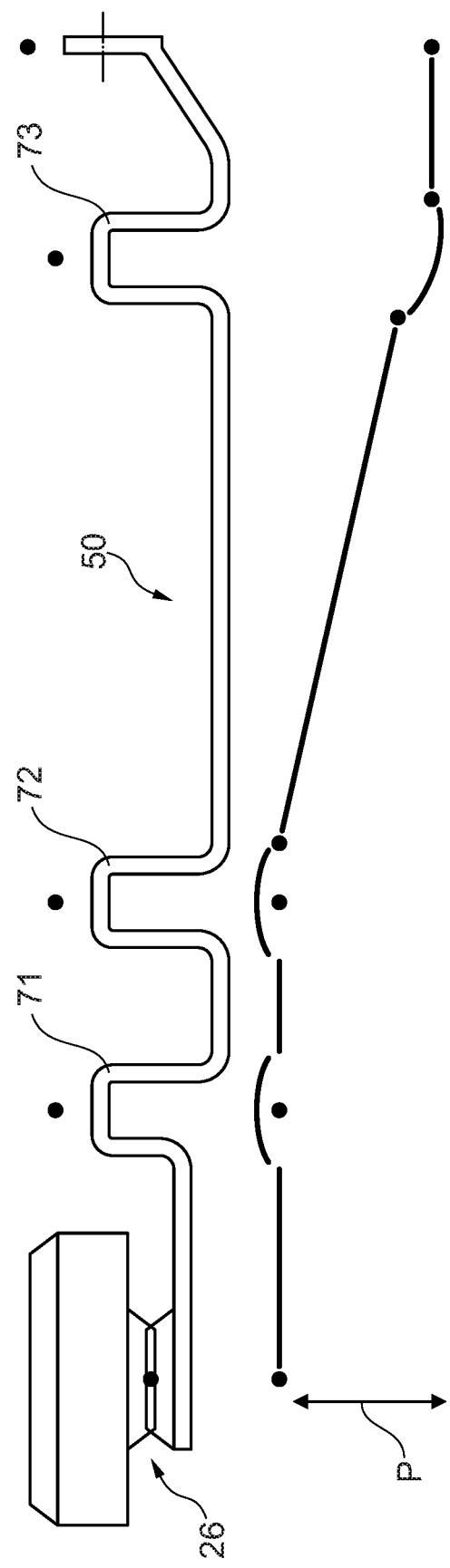
FIG. 9A shows a schematic representation of a shaft known in the prior art.

In the upper half of FIG. 9A a generally known shaft design is shown schematically. The left end of the shaft component 50 is linked to the sun gear 26, the right end of the shaft component is linked to a driving part, such as a turbine section (not shown here). The shaft component 50 comprises three undulant sections 71, 72, 73 with the aim of deliberately altering the stiffness of the shaft component 50.

In the lower half of FIG. 9A a representation of the center line of the shaft component 50 is shown under a load causing a parallel offset P.

Starting from left, the centerline is relatively straight till the first undulant section 71 as the shaft component is relatively stiff. The first and second undulant sections 71, 72 reduce the stiffness locally, so that the center line comprises two slightly curved sections in the respective undulant sections. Towards the right, the third undulant section 73 introduces a further localized reduction of the stiffness, causing a further curved section in the center line.

Embodiments considered here, differ by utilizing different regions 51, 52, 53 composed of different section types within the shaft component 50.

This is shown for example in FIG. 9B and FIG. 9C. FIG. 9B shows an embodiment of a shaft component 50 approaching a similar behavior than the one shown by the shaft component 50 in FIG. 9B but using different regions with different fiber properties. In FIG. 9B the load case with a parallel offset of the center line is shown as in FIG. 9A. In FIG. 9C a center line for the same shaft component 50 as in FIG. 9B is shown under constrained bending load.

Here the shaft component comprises two regions 51, 52 (designated C-E) at either end of a region 53 (designated A-C or B-C) creating a shaft component 50 design which retains adequate torsional strength and stiffness to avoid whirling vibrations, but with a tailored bending stiffness to isolate the gearbox from damaging mis-alignments and bending moments. This has the same or similar effect as the design of the shaft component 50 in FIG. 9A. The regions 51, 52, 53 are adjacent to each other. This also means that in all regions three regions 51, 52, 53 fibers with an angular fiber orientation between 40° and 50° (section type C) are present.

While the regions designated C-E have low or very low axial stiffness properties, they only contribute to the overall stiffness of the shaft in proportion to their length, allowing the design to meet the overall target axial stiffness.

Similarly, the central region 53 designated A-C or B-C maintains the natural frequency at a high value and avoids any damaging whirling vibrations. The two regions 51, 52 designated C-E both deform in a pivoting style motion to allow any mis-mismatch between the ends of the shaft component 50 while isolating the gearbox from damaging bending moments.

By designing composite shafts with the methods described above, the axial and torsional stiffness' can be maintained while producing significant reductions in the bending moment shaft stiffness, without the need to include reductions in stiffness with large geometric features as shown in regions 51, 52. The composite shaft can actually have a plain cross-section without any significant disturbance.

It should be understood that the above description is intended for illustrative purposes only, and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

We claim:

1. A shaft component comprising:
   a body with at least two regions comprising fiber reinforced plastic, with fibers in the at least two regions differing in their composition, geometric properties, density, radial position, axial position and/or in their fiber orientation in the body, wherein:
   in at least one region of the at least two regions the fibers are arranged in an angular range of +/−40° to 50° in relation to a main axis of rotation of the body,
   in at least one region of the at least two regions the fibers are arranged parallel to the main axis of rotation of the body, and
   a first region of the at least two regions which is adjacent to a second region of the at least two regions with a different fiber orientation has a transitional zone wherein the fibers change direction over a portion of an axial length of the body, such that more than 90% of a fiber angle change is contained within an axial extent no greater than 10% of the shorter of the first region and the second region.

2. The shaft component of claim 1, wherein, the at least two regions includes at least three regions, and in at least one region of the at least three regions the fibers are arranged in an angular range of 60 to 90° in relation to the main axis of rotation of the body.

3. The shaft component of claim 1, wherein the body has a non-constant or non-uniform diameter along the axis of rotation.

4. The shaft component of claim 3, wherein the body comprises undulations.

5. The shaft component of claim 1, wherein ratios between resin in the fiber reinforced plastic and fibers are different in the at least two regions.

6. The shaft component of claim 1, wherein fiber bundle counts and fiber diameters are different in the at least two regions.

7. The shaft component of claim 1, wherein an angle of the fiber arrangement varies radially in the at least two regions.

8. The shaft component of claim 1, wherein at least one woven material is used in least one region of the at least two regions.

9. The shaft component of claim 1, wherein a ratio between a largest diameter and a smallest diameter of the body is less than 1.1.

10. The shaft component of claim 1, wherein the fiber reinforced plastic comprises carbon fibers, metal filaments, synthetic fibers or a mixture thereof.

11. The shaft component of claim 1, wherein the fiber reinforced plastic comprises aramid fibers, ceramic fibers or a mixture of aramid fibers and ceramic fibers.

12. A gas turbine engine for an aircraft, the gas turbine engine comprising:
   an engine core comprising a turbine, a compressor, and a core shaft connecting the turbine to the compressor;
   a fan, which is positioned upstream of the engine core, wherein the fan comprises a plurality of fan blades; and a gear box, which can be driven by the core shaft, wherein the fan can be driven by means of the gear box at a lower rotational speed than the core shaft, and wherein the shaft component of claim 1 is connected to the gear box as part of a drive shaft for the fan.

13. A method for producing a shaft component, comprising:
providing a body, wherein providing the body comprises:
incorporating fibers in a matrix so that the body has at least two regions of fiber reinforced plastic with the fibers that differ in composition, geometric properties, density, radial position, axial position and/or in fiber orientation in the body, wherein:
in at least one region of the at least two regions the fibers are arranged in an angular range of +/−40° to 50° in relation to a main axis of rotation of the body,
in at least one region of the at least two regions the fibers are arranged parallel to the main axis of rotation of the body, and a first region of the at least two regions which is adjacent to a second region of the at least two regions with a different fiber orientation has a transitional zone wherein the fibers change direction over a portion of an axial length of the body, such that more than 90% of a fiber angle change is contained within an axial extent no greater than 10% of the shorter of the first region and the second region.

14. The method of claim 13, wherein a winding method, a braiding method, a Tailored Fiber Placement method or a combination of those methods is used for incorporating the fibers in the body.

15. The method of claim 13, wherein the fiber reinforced plastic comprises carbon fibers, metal filaments, synthetic fibers or a mixture thereof.

16. The method of claim 15, wherein the fiber reinforced plastic comprises aramid fibers, ceramic fibers or a mixture of aramid fibers and ceramic fibers.

* * * * *